United States Patent
Golasky et al.

(10) Patent No.: US 7,586,942 B2
(45) Date of Patent: Sep. 8, 2009

(54) IDENTIFYING HOST COMPUTERS AT A PHYSICAL LAYER

(75) Inventors: Richard Golasky, Round Rock, TX (US); Daniel R. McConnell, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 942 days.

(21) Appl. No.: 10/731,222

(22) Filed: Dec. 9, 2003

(65) Prior Publication Data

US 2005/0122991 A1    Jun. 9, 2005

(51) Int. Cl.
*H04J 3/22* (2006.01)
(52) U.S. Cl. .............. 370/466; 370/467; 370/469; 370/475; 709/224; 709/245
(58) Field of Classification Search ............ 370/466, 370/467, 469, 475; 709/224, 245
See application file for complete search history.

(56) References Cited

U.S. PATENT DOCUMENTS

| | | | |
|---|---|---|---|
| 6,243,386 B1 | 6/2001 | Chan et al. ............. 370/403 |
| 6,400,730 B1 | 6/2002 | Latif et al. ............. 370/466 |
| 6,631,481 B1* | 10/2003 | Hoard et al. ............. 714/41 |
| 6,683,883 B1* | 1/2004 | Czeiger et al. ........... 370/401 |
| 6,766,412 B2* | 7/2004 | Bolt ....................... 711/111 |
| 6,845,395 B1* | 1/2005 | Blumenau et al. ........ 709/223 |
| 6,848,007 B1* | 1/2005 | Reynolds et al. ......... 709/245 |
| 6,965,934 B1* | 11/2005 | Reynolds et al. ......... 709/224 |
| 2002/0144046 A1 | 10/2002 | Hooper, III ............. 710/316 |
| 2002/0161852 A1 | 10/2002 | Allen et al. ............. 709/217 |
| 2002/0161951 A1 | 10/2002 | Allen et al. ............. 710/106 |
| 2002/0162010 A1 | 10/2002 | Allen et al. ............. 713/200 |
| 2003/0084219 A1* | 5/2003 | Yao et al. ............... 710/300 |
| 2003/0154271 A1 | 8/2003 | Baldwin et al. .......... 709/223 |

FOREIGN PATENT DOCUMENTS

| | | |
|---|---|---|
| GB | 2380643 A | 4/2003 |
| JP | 2002324042 | 11/2002 |
| WO | WO 00/14645 | 3/2000 |
| WO | WO 01/35188 A2 | 5/2001 |
| WO | WO 01/44891 A2 | 6/2001 |
| WO | WO 02/03610 A2 | 1/2002 |

* cited by examiner

*Primary Examiner*—William Trost, IV
*Assistant Examiner*—Toan D Nguyen
(74) *Attorney, Agent, or Firm*—Baker Botts L.L.P.

(57) ABSTRACT

Methods, systems, and computer programs are disclosed. The method includes issuing a command in a first protocol, converting the first protocol into a second protocol, adding information to the command in the second protocol that identifies the host that may have issued the command, and sending the command to a target device.

27 Claims, 7 Drawing Sheets

IDENTIFYING HOST COMPUTERS AT A PHYSICAL LAYER

FIELD OF THE INVENTION

This invention relates, in general, to information handling systems, and, more particularly, to an information handling system that may identify host computers at a physical layer.

BACKGROUND OF THE INVENTION TECHNOLOGY

The present invention is related to information handling systems. As the value and use of information continues to increase, individuals and businesses seek additional ways to process and store information. One option available to users is information handling systems. An information handling systems generally processes, compiles, stores, and/or communicates information or data for business, personal or other purposes, thereby allowing users to take advantage of the value of the information. Because technology and information handling needs and requirements vary between different users or applications, information handling systems may also vary regarding what information is handled, how the information is handled, how much information is processed, stored or communicated, and how quickly and efficiently the information may be processed, stored or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store and communicate information and may include one or more computer systems, data storage systems and networking systems.

Some information handling systems include multiple host computers and multiple storage devices such as SCSI tape drives or storage area networks (SANs). When a host computer sends a SCSI command to a SCSI target device, the host typically does not send the command directly to the SCSI device using a single transport protocol. Instead the host may send the SCSI command via other interfaces and protocols such as fibre channel or iSCSI/Ethernet. SCSI target devices, however, do not usually operate or respond to fibre channel protocol. Rather an appliance or bridge converts or translates a SCSI command encoded in fibre channel protocol or iSCSI protocol to a SCSI command encoded in SCSI protocol and then sends the command to the SCSI target device.

After the SCSI command has been translated from a fibre channel protocol or iSCSI protocol into a SCSI protocol, information about the host that issued the SCSI command may be removed. If a SCSI analyzer is connected between the appliance and the SCSI target device, the source of the SCSI command may not be available or presented within the protocol to the analyzer. Fibre channel analyzers may be used to determine the source and destination ports on a fibre channel link, but not at the SCSI protocol interface. Since the fibre channel interface operates independently of the SCSI interface on an appliance, the SCSI layer lacks information about a fibre channel port address. Consequently, when used in conventional SCSI systems, SCSI analyzers can determine the target identifier the data is to be sent to, but cannot determine the source identifier within a fibre channel or iSCSI shared storage environment.

SUMMARY OF THE INVENTION

In general, in one aspect, this invention features a method for identifying a host system at a physical layer of an information handling system. The information handling system may include a plurality of hosts. One of the hosts may issue a command in a first protocol. The command may be received by a protocol converting module and converted into a second protocol. An address or identifier may be added to the command in the second protocol to make a revised command. The identifier in the revised command may be used to identify the host that issued the command in the first protocol. The revised command may be sent to a target device.

In general, in another aspect, this invention features a system for identifying a host at a physical layer of an information handling system. The system may include a plurality of hosts operably connected to a switch. One of the plurality of hosts may issue a command in a first protocol. The system may also include an appliance for converting the command in a first protocol into a command in a second protocol. The appliance may also include a module for encoding the address of the host that issued the command. The encoding module may add an identifier to the command in the second protocol to make a revised command. The identifier may associate the one of the plurality of hosts that issued the first command. The system may also include a target device responsive to the command in the second protocol, and the target device including a module for identifying the host.

A technical advantage of disclosed systems and methods of identifying host computers at a physical layer is the identification a host computer at a point downstream from an appliance. Another technical advantage of disclosed systems and methods of identifying host computers at a physical layer is the ability to encode information about a first protocol into a second protocol, and then to restore the original information that was encoded in the second protocol. Still another technical advantage of disclosed systems and methods of identifying host computers at a physical layer is identifying a fiber channel host or an iSCSI host at a SCSI layer.

Other features and advantages will become apparent from the description and claims that follow.

BRIEF DESCRIPTION OF THE DRAWINGS

A more complete understanding of the present disclosure and advantages thereof may be acquired by referring to the following description taken in conjunction with the accompanying drawings wherein:

FIG. 5 is a diagram of a system for identifying an iSCSI host at a SCSI layer;

Figure 1:
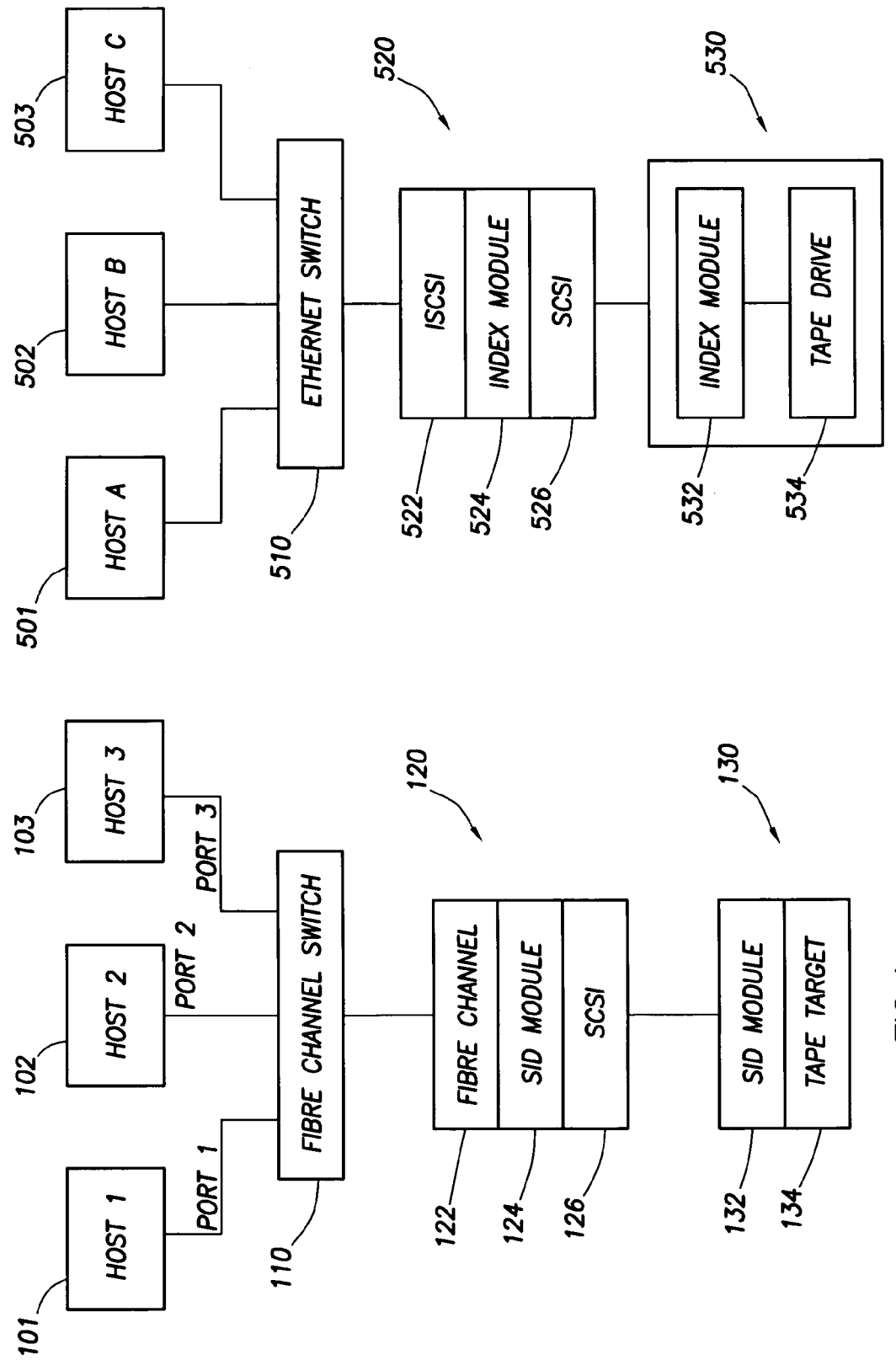
FIG. 1 is a diagram of a system for identifying a fibre channel host at a SCSI layer.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention as defined by the appended claims are intended to be covered.

DETAILED DESCRIPTION OF SPECIFIC EMBODIMENTS

The present invention is directed to an information handling system which may include any instrumentality or aggregate of instrumentalities operable to compute, classify, process, transmit, receive, retrieve, originate, switch, store, display, manifest, detect, record, reproduce, handle or utilize any form of information, intelligence, or data for business, scientific, control or other purposes. For example, an information handling system may be a personal computer, a network storage device or any other suitable device and may vary in size, shape, performance, functionality and price. The information handling system may include random access memory ("RAM"), one or more processing resources such as a central processing unit ("CPU") or hardware or software control logic, ROM and/or other types of nonvolatile memory. Additional components of the information handling system may include one or more disk drives, one or more network ports for communicating with external devices as well as various input and output ("I/O") devices, such as a keyboard, a mouse and a video display. The information handling system may also include one or more buses operable to transmit communications between the various hardware components.

In general, the disclosed systems and methods utilize an unused or reserved field or portion of a command protocol to carry information about the issuing host to the SCSI target located at a different physical layer. Information such as a port identification address of a fibre channel switch, IP address or index value of a particular host may be embedded within the unused or reserved field of a command protocol. The identifier or particular payload embedded within the unused or reserved field may be used to associate the issuing host with the target device that executes the command issued by the issuing host. The modified field may be restored to its original value before the command is executed by a target device. In one example, information embedded in the command protocol may be analyzed for debugging purposes, and the issuing host may be identified at a physical layer such as a target device.

In one aspect, this invention provides a SCSI interface system with the ability to determine which fibre channel host (via the Port ID address) sent data to a SCSI target such as a tape backup device. The SCSI interface layer of a FC-SCSI appliance or bridge may encode a fibre channel Port ID address in the control field of the SCSI command descriptor block (CDB). Any SCSI test instrument or SCSI target device may decode the fibre channel Port ID address embedded in the control field. The disclosed methods and systems may also preserve the original control field in the CDB before sending the SCSI command to the SCSI target. In one example, the appliance Source Identification (SID) control module may decode port ID addresses on 64 port fibre channel switches. The SID control module may be dynamically de-activated on SCSI commands that do not use the control field. The SID control module internal database defines all SCSI CDBs and the byte of the control field. A SID control module may be provided to the appliance system and target device. At the target device, the SID control module may restore the original value to the control field.

The disclosed systems and methods enable a SCSI system interface to identify which fibre channel ("FC") host is sending data to a SCSI target device by utilizing an unused or reserved control field byte in the SCSI command descriptor block ("CDB"). The target device receives the SCSI CDB unaltered, thus preserving the integrity of the SCSI protocol. The present invention is preferably suited for fibre channel environments with non-cascading fibre channel switches. These types of switches are commonly used in storage area network (SAN) environments. The disclosed systems and methods may identify a fibre channel switch port ID addresses at a SCSI link level. The disclosed systems and methods may be used as a debugging tool to identify the host server and SCSI target device problems in fibre channel environments. The disclosed systems and methods may be incorporated with any tape backup and appliance vendor.

Turning to FIG. 1, one example system for identifying an issuing host at a physical layer is presented. The example system in FIG. 1 includes 3 host computers: Host 1 (101), Host 2 (102), and Host 3 (103). The hosts are connected to a fibre channel switch 110. As shown in FIG. 1, each of the 3 hosts are connected to fibre channel switch 110 through a separate port. The fibre channel switch is also connected to a bridge or appliance, labeled generally as 120. The appliance converts the fibre channel protocol to a SCSI protocol. Appliance 120 may include a fibre channel module 122, a source identification module 124 and a SCSI module 126. Appliance 120 is also connected to a SCSI target device, which is shown generally as 130. SCSI target device 130 may include a source identification module 132 and a SCSI tape backup target 134.

In fibre channel to SCSI systems, the SCSI side 126 of an appliance typically lacks knowledge of which host issued a particular SCSI command. The bridge or appliance typically reissues or translate the command, but does not provide to the SCSI target device information identifying the fibre channel host that issued a SCSI command. The disclosed invention provides fibre channel host information to the SCSI side of the appliance. In one implementation, a fibre channel to SCSI appliance 120 may be modified so that a host identifier may be transmitted to the SCSI tape target. A SCSI analyzer may be introduced into the SCSI side of the system to view the host identifier via the contents in the control field byte. The SCSI analyzer may monitor data that is transferred to the SCSI target device. In one example, appliance 120 is modified by adding a source identification (SID) module 124. By identifying the fibre channel port that was connected to the issuing host, SID 124 may transfer to the SCSI side of the system information related to the fibre channel host that issued a command.

One implementation of a method to identify an issuing fibre channel host at the SCSI level utilizes an unused byte or field of a SCSI command or protocol. One example field or byte in a SCSI protocol is the control field byte within the command descriptor block (CDB). In a conventional SCSI command, the control field byte may be zero for certain SCSI target devices. For example, an Ultrium LTO tape device requires a value of zero in the control field byte. A non-zero value will be rejected by the tape device with a check condition. If the control field byte of the CDB has a value other than zero, the SCSI target may reject the SCSI command. Therefore, in the case of a SCSI command protocol having a control field byte value of zero, the contents or payload of the CDB may be modified and then restored to its original value of zero before the SCSI device receives the SCSI command. Furthermore, a non-zero value in the control field byte may also be modified to identify the issuing SCSI host. In this case, it may not be necessary to return the control field byte to its original value, since a SCSI target device may reject a command that contained a non-zero value in the control field byte.

In some information handling systems, it may be desirable to use a SCSI analyzer to monitor system performance. For example, a SCSI analyzer may be connected between appliance 120 and SCSI device 130 of FIG. 1. Because the fibre channel port address is encoded in the control field, the issuing host may be identified through identification of the fibre channel port ID address. Consequently, a fibre channel host is identifiable at a SCSI layer.

The SID control module at the appliance may perform one or more of the following actions:

Decode a fibre channel (FC) frame;
Obtain the FC port ID address from the FC frame;
Check an internal database for the control field byte of the CDB;
Verify that the original value of the control field byte is non-zero then set an identification bit (bit 7) in the control field to indicate a non-zero value; and
Embed the FC Port ID address into the SCSI CDB control field (bits 0-6).

The new or revised SCSI CDB is then sent to the SCSI target. The revised SCSI CDB is first analyzed by a SID control module within the tape drive. The SID control module in the SCSI target device may analyze an identification bit (bit 7) of the control field byte. If bit 7 is set to one, then the control field byte from the host system was originally non-zero. Otherwise, the control field byte was originally zero. Furthermore, if bit 7 was set to 1, then the SID control module may zero out the bits 0-6 of the control field, and maintain the value of one at bit 7. In another example, the SID control module will not modify the control field if the control field byte was originally non-zero. On the other hand, if bit 7 was zero, then the SID control module will zero out bits 0-6 and maintain the 0 value at bit 7.

Figure 2:
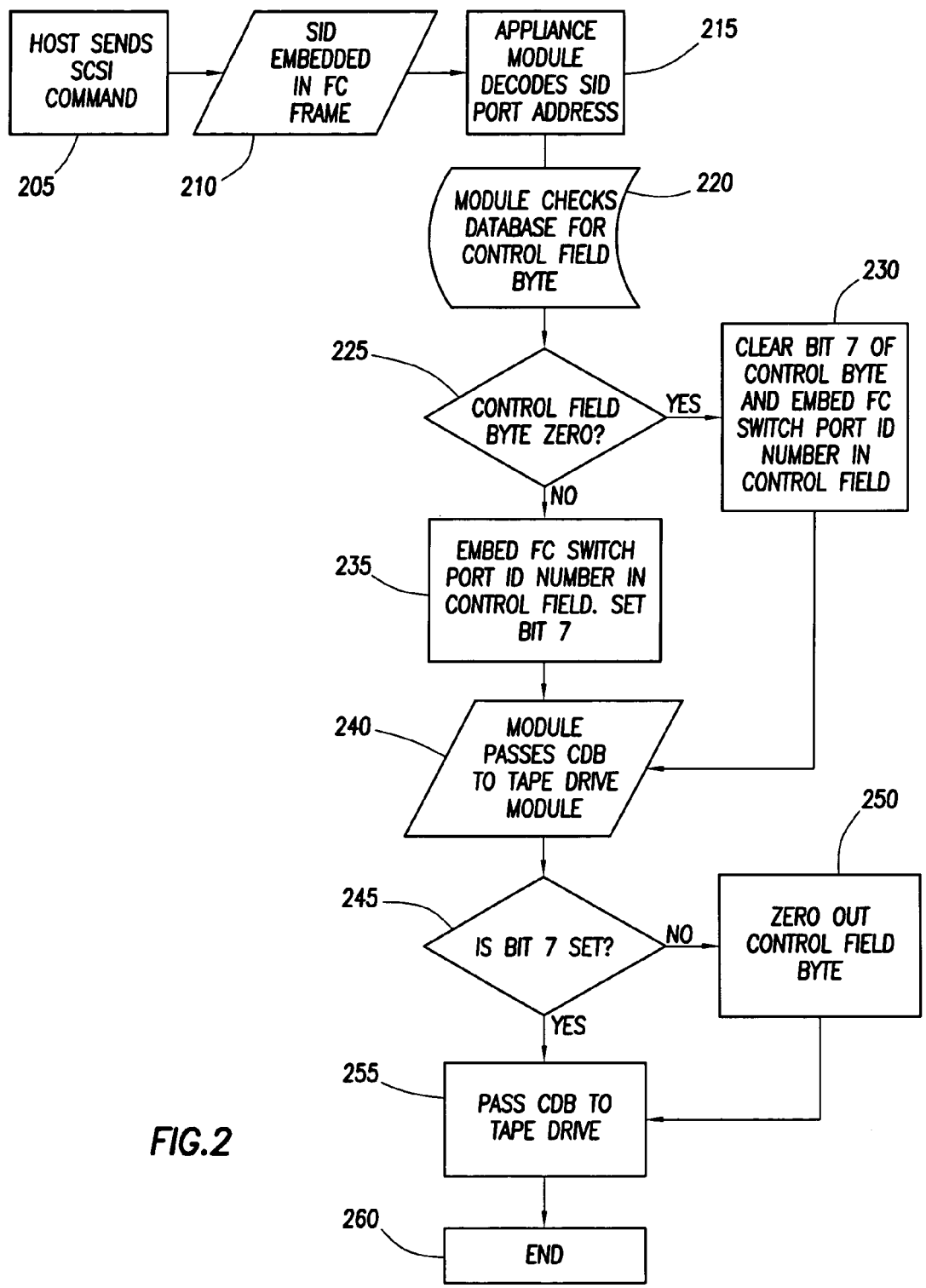
FIG. 2 is a flow diagram of a method for identifying a fibre channel host at a SCSI layer.

A block diagram of a method for identifying an issuing host at a target layer is shown in FIG. 2. The method begins when the host sends a SCSI command (block 205). The SCSI command is then embedded with a source identifier in a fibre channel frame at block 210. The appliance module decodes the SID port address at block 215. The module also checks the database for the control field byte (block 220). If the control field byte is zero, the module clears bit 7 of the control field byte by setting bit 7 to zero. The module also embeds the fibre channel switch port ID number in the control field (block 230). Otherwise if the control byte is non-zero, the module embeds a fibre channel switch port ID number in the control field and sets bit 7 to one (block 235). The module may pass the CDB to tape drive module (block 240). At block 245 a module in the tape drive checks to see if bit 7 is set. If bit 7 is not set, the control field byte is restored to zero (block 250). Otherwise, if bit 7 is set, the control data byte is sent to the tape drive (block 255). The method eventually ends at step 260.

Figure 3:
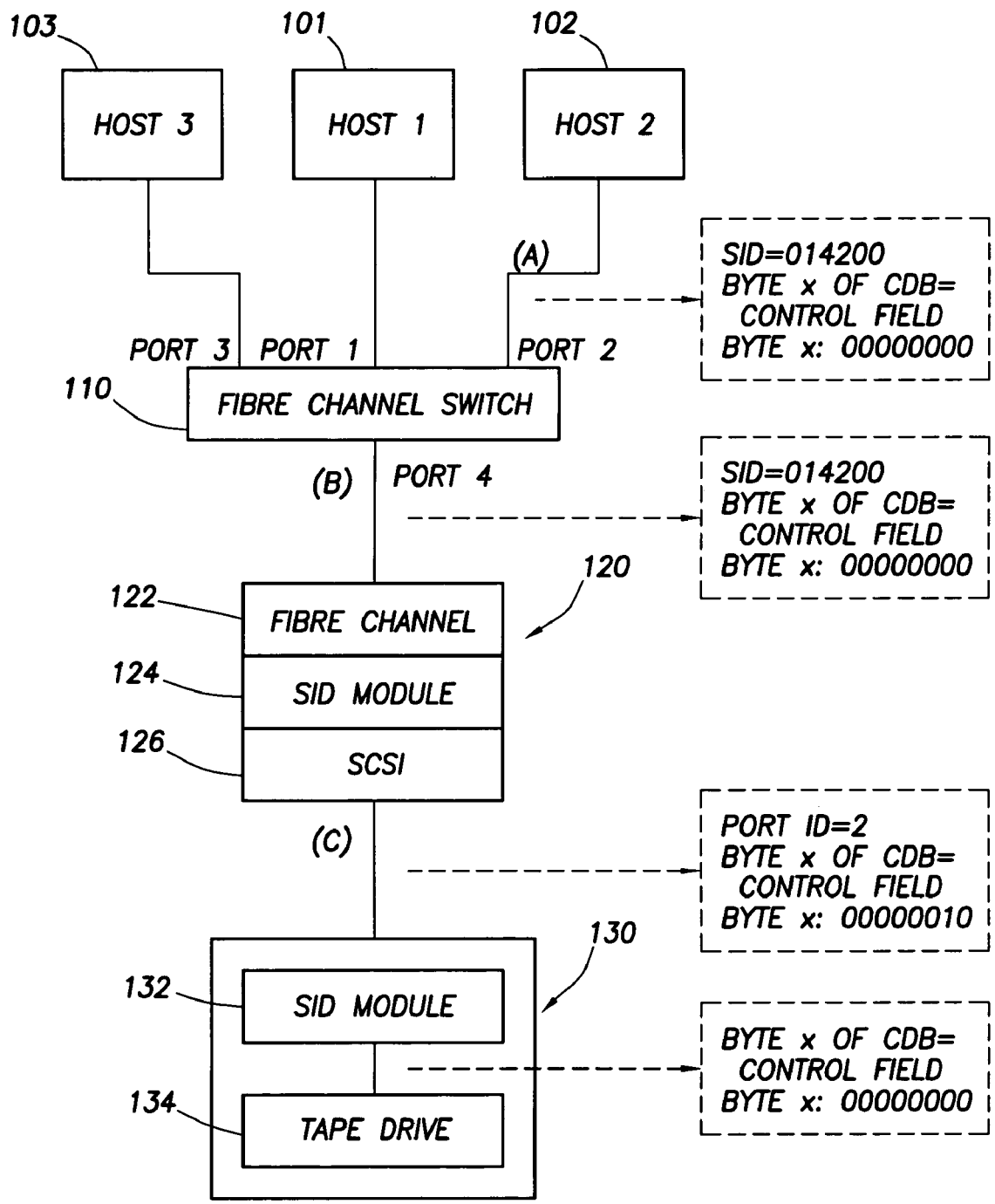
FIG. 3 is a diagram of a system having a zero control field byte for identifying a fibre channel host at a SCSI layer.

One example of a method for identifying a fibre channel host at a SCSI layer is shown in FIG. 3. This example illustrates the case for which the original control field byte of the CDB is zero. The method begins with Host Server (102) (port 2) of the FC switch sending a SCSI CDB to the SCSI tape device 130. As shown in the dotted box between host 2 and the fibre channel switch, the source ID or SID has the value of 014200. Here, the fibre channel (FC) frame at Point A contains the FC Port address and the embedded SCSI CDB.

The FC frame travels through Port ID four (Point B) of fibre channel switch 110, which is connected to FC-SCSI appliance 120. SID control module 124 of FC-SCSI appliance 120 decodes the Source Identification (SID) address (FC switch Port ID address), which has the value of two (Port ID). The SID of the example shown in FIG. 3 is 014200, and the corresponding host value encoded within this SID value is 2 as shown by the third bit having the value of 2. Consequently, the Port ID has a value of 2 in the example shown in FIG. 3. Alternatively, if host 1 would have issued the command, then the third bit of the SID value in this alternative example would have been 1.

SID control module 124 checks an internal pre-defined CDB database in the SID control module 124 to determine the location of the control field within the CDB. The SID control module 124 also determines if the value of the control field is zero. If this value is non-zero, the SID control module 124 sets bit 7 (Identification bit) of the control field byte to one indicating that the original value of the control field was non-zero. Otherwise, if the control field was originally zero, the SID control module 124 shall clear bit 7. In any event, bit 7 of the control field byte remains zero if the original value of the control field was zero. SID control module 124 additionally embeds or codes the Port ID address into bits 0-6 of the control field byte. Since the port ID address for the example shown in FIG. 3, is 2, the value of 2 is encoded into the control field byte. As shown in the dotted box between the appliance 120 and the target device 130, only bit 2 of the CDB byte is one. The value of 2 (decimal) is encoded into the value of the control field byte. Therefore, the payload of the CDB byte is set equal to the port ID address of the issuing host 2. Also shown in this dotted box is the port ID address, which itself is 2. SID module passes the new SCSI CDB to the SCSI interface of the FC-SCSI appliance.

After the modified SCSI command is sent to the SCSI target device 130, the SCSI command should be reset to its original value before this command is received by the tape drive. The SCSI interface system of the appliance passes the SCSI CDB through the SCSI bus (Point C), which is then received by the SCSI target device SID control module 132.

The SCSI target device SID control module 132 checks bit 7 of the CDB byte to determine if its value is one or zero. If bit 7 is zero, then the original value (from the host) of the SCSI CDB control field byte was also zero. Bits 1 through 6 are reset to zero just as it was when the CDB was received by the FC-SCSI appliance. The SCSI command is then transmitted to the tape drive 134 (point D) for processing. Even if the control field byte of the CDB is zero, the port ID address will be determined at the SCSI layer and the tape drive will still be able to process the CDB. The command descriptor block will arrive at the tape drive in an unaltered state. This state is the same as the state of the CDB originally received by the fibre channel of the SCSI appliance.

If on the other hand bit 7 of the CDB byte is one, then the original SCSI command issued by the fibre channel host was also non-zero. In this situation, the contents of bits 0 through 6 need not be reset to its original value since bit 7 being set to one already identifies a non-zero number. The SCSI CDB is then passed to SCSI target device 130 (Point D). The SCSI tape target device will then reject the CDB with a check condition per tape drive specification. The second situation, e.g., a non-zero control field byte value, is further illustrated in FIG. 4.

Figure 4:
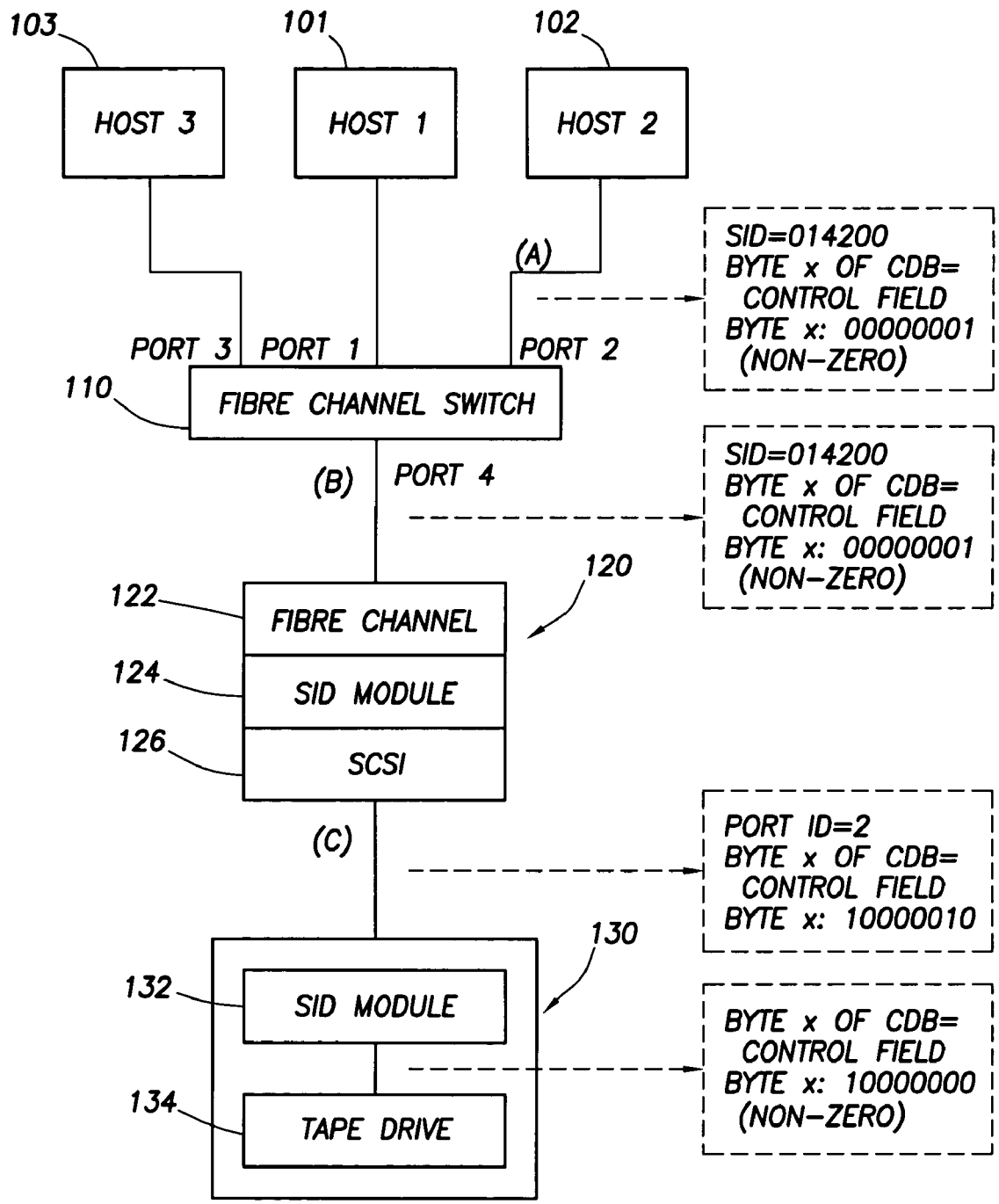
FIG. 4 is a diagram of a system having a non-zero control field byte for identifying a fibre channel host at a SCSI layer.

In the system shown in FIG. 4, host 2 issues a fibre channel command in which the value of the control field byte in the CDB is non-zero. The fibre channel host 2 issues the fibre channel command through port 2 of fibre channel switch 110. Similar to system of FIG. 3, the SID value of the issued command is 014200 signifying that, among others, the issuing host was coupled through port 2. The fibre channel switch then transfers the command through port 4 to the two-way SCSI fibre channel appliance 120. During this transfer, as shown by the dotted box between the fibre channel switch and appliance, the SID value and the CDB byte are unchanged.

At the appliance 120, the SID module identifies the port ID address of the issuing host 2. The SID module 124 analyzes the SID value, which in this case is 014200 to determine that the issuing host has a port ID address of 2. The SID module also identifies the control field byte. After identifying the byte, the SID module then identifies or determines the value or the payload of that byte. In this case, the CDB control field byte is 0000001 or a value of binary 1 signifying that the CDB control field byte value is non-zero. The SID module 124 then encodes the port ID address into the control field byte of the CDB. The result of this encoding is shown in the dotted box adjacent to the letter C in FIG. 4. In this case, bit one of the control field byte is set to 1 signifying that the port ID address, when analyzing bit 0 through 6 of the CDB byte, has a value of 2. Moreover, since the original control field byte value is non-zero, bit 7 is set to 1 as shown in the same box. This process enables a quick identification of whether the original value of the control field byte was zero or non-zero. If bit 7 is zero, then the original control field byte value was also zero. Otherwise, if bit 7 is one, then the original control field byte value was a non-zero value.

The modified CDB byte is then transferred within the SCSI protocol from the appliance 120 to the SCSI device 130. Before the SCSI target device can read or respond to the SCSI command, the SCSI command should be reset to the value of the command issued by host 2. To perform this task, the SID module first determines if the original control field byte value was zero or non-zero. In the example shown in FIG. 7, bit 7 was set to one signifying that the original control field byte was non-zero. Once the control field byte has been determined to be non-zero, the SID module may then zero out the remaining bits (bits 0-6) before sending the SCSI command to the tape drive 134. Under these conditions, tape drive 134 receives a SCSI command with a non-zero control field byte value because bit 7 of the control field byte has been set to 1. In another example, once it is determined that the control field byte value was initially non-zero, bits 0 through 6 need not be zeroed out and may be sent as is to the SCSI target device with the port ID address encoded within bit 0 through 6, and bit 7, having been set to one, signifying that the original CDB byte value was non-zero. Under either of these scenarios, the tape drive will receive a SCSI command with a non-zero CDB byte value and consequently the tape drive will reject the SCSI command with a check condition status.

Therefore, even if the control field value is non-zero, the port ID address will be determined from bits 0-6 of the control field byte at the SCSI layer, and the tape drive will detect that's an invalid CDB and return a check condition per tape drive specification. When the command descriptor block reaches tape drive, it will arrive as a non-zero value just as it did when the fibre channel of the SCSI appliance originally received it. The end result is that the FC port ID address can be determined at the SCSI layer, and the SCSI target tape device receives an unaltered CDB.

In addition to a fibre channel to SCSI system, the disclosed methods and systems also apply to an iSCSI to SCSI system. The disclosed methods and systems may be used as a debugging tool for engineering and support personnel in identifying host server to SCSI target problems in iSCSI environments. In an iSCSI environment, a larger number of hosts can share a tape backup library using an iSCSI-SCSI bridge appliance. Devices at a SCSI layer typically lack knowledge of which iSCSI host is sending commands or data to a SCSI target tape device. The disclosed systems and methods identify, at a SCSI layer, the IP Address and iSCSI node name of a system that is sending data to a SCSI target device. Once the information is decoded, the target device may receive the SCSI command descriptor block in an unaltered state, thus preserving the integrity of the SCSI protocol. In one example, an index value is embedded in an unused/reserved control field byte of the CDB. The index value is then mapped to an entry in the iSCSI-SCSI appliance database.

In general, the disclosed systems and methods determine, at a SCSI layer, which host system (IP Address and iSCSI node Name) is sending data to a SCSI target device. The SCSI interface layer of an iSCSI-SCSI appliance may embed an index value in the control field byte of the SCSI command descriptor block (CDB). When iSCSI hosts log into the appliance, the appliance database assigns an index value to each host registered and records the host IP Address and iSCSI node name. An index module (IDM) is installed on both the appliance and the SCSI target device (i.e. LTO tape drive). The appliance index module (IDM) will decode the host IP Address and iSCSI node name from the iSCSI PDU header. The embedded index value in the control field byte is a value that is mapped back to an iSCSI-SCSI appliance index database which holds information about each host.

FIG. 5 shows one example information handling system having an iSCSI to SCSI component. As shown in FIG. 5, when a host issues a SCSI command, the SCSI command passes through an ethernet switch 510. The ethernet switch then transmits the command to an iSCSI-SCSI appliance 520. The iSCSI-SCSI appliance 520 then transfers the command to a SCSI target device 530. The iSCSI-SCSI appliance 520 may include an iSCSI module 522, an index module 524 and a SCSI module 526. The SCSI target device 520 may include an index module 532 and a SCSI tape drive 534.

An iSCSI host sending commands to an ethernet switch may be identified by its IP address. An IP address may take the form of four numbers separated by dots, for example, 146.46.52.3. Encoding all four digits of an IP address in a SCSI command may require four bytes, which is much larger than the eight bit control field. An alternative approach of identifying the IP address of the issuing hosts is to set up a reference to a table of IP addresses. The use of the control field byte to encode host identification information permits seven bits of identification (One bit is used to identify a zero or non-zero initial control field byte value). Consequently, a maximum of 128 IP hosts may be identified by the corresponding IP addresses.

A table may be created within an information handling system that correlates or associates an IP address to a particular host computer. For example, an index table may be set up whereby an index value refers to a particular host computer and the value stored at that index value is the IP address of the host. The system shown in FIG. 5 includes 3 hosts, Host A 501, Host B 502, Host C 503. A table having elements 1, 2, and 3 may be maintained in the appliance or bridge. The first element refers to the IP address of Host A 501, the second element refers to the IP address of Host B 503 and the third element refers to the IP address of Host C 503. The content of the first element of the table would be the IP address of Host A. The content of the second element of the table is the IP address of Host B, and the content of the third element of the table is the IP address of Host C. In this method, index value is embedded within an unused byte or field of the SCSI command. The index value refers to a table containing a list of IP addresses. The index module 532 at the SCSI device 530 identifies the index value and also restores the original value of the control field byte.

The IDM at the appliance 524 performs the following actions:

Assign an index value to each registered host;

Decode an iSCSI protocol data unit (PDU) to obtain an IP Address and an iSCSI node name;

Check and internal database for the control field byte of the CDB;

Check if the original value of the control field byte is zero or non-zero. If the original control field byte is zero, clear bit 7 (ID bit) in the control field. If the original value of control field was non-zero, then set bit 7 to 1; and Embed index value into the SCSI CDB control field (bits 0-6). The index value is a pointer value into the appliance database;

The modified or revised SCSI CDB is then sent to the SCSI target device. (A SCSI analyzer may capture the CDB to obtain data). When the CDB reaches the target device, it is first analyzed by the IDM within the target device. The IDM in the SCSI target device will perform the following actions:

Determine if the original control field byte in the SCSI CDB was modified. This is determined by the identification bit (bit 7) that was set or cleared in the control field byte; and If bit 7 is set to 1, then the original control field byte was non-zero. The entire CDB is passed to the SCSI target device. However, if bit 7 was set to zero, then the IDM will zero out the control field byte then pass the entire CDB to the SCSI target device.

Figure 6:
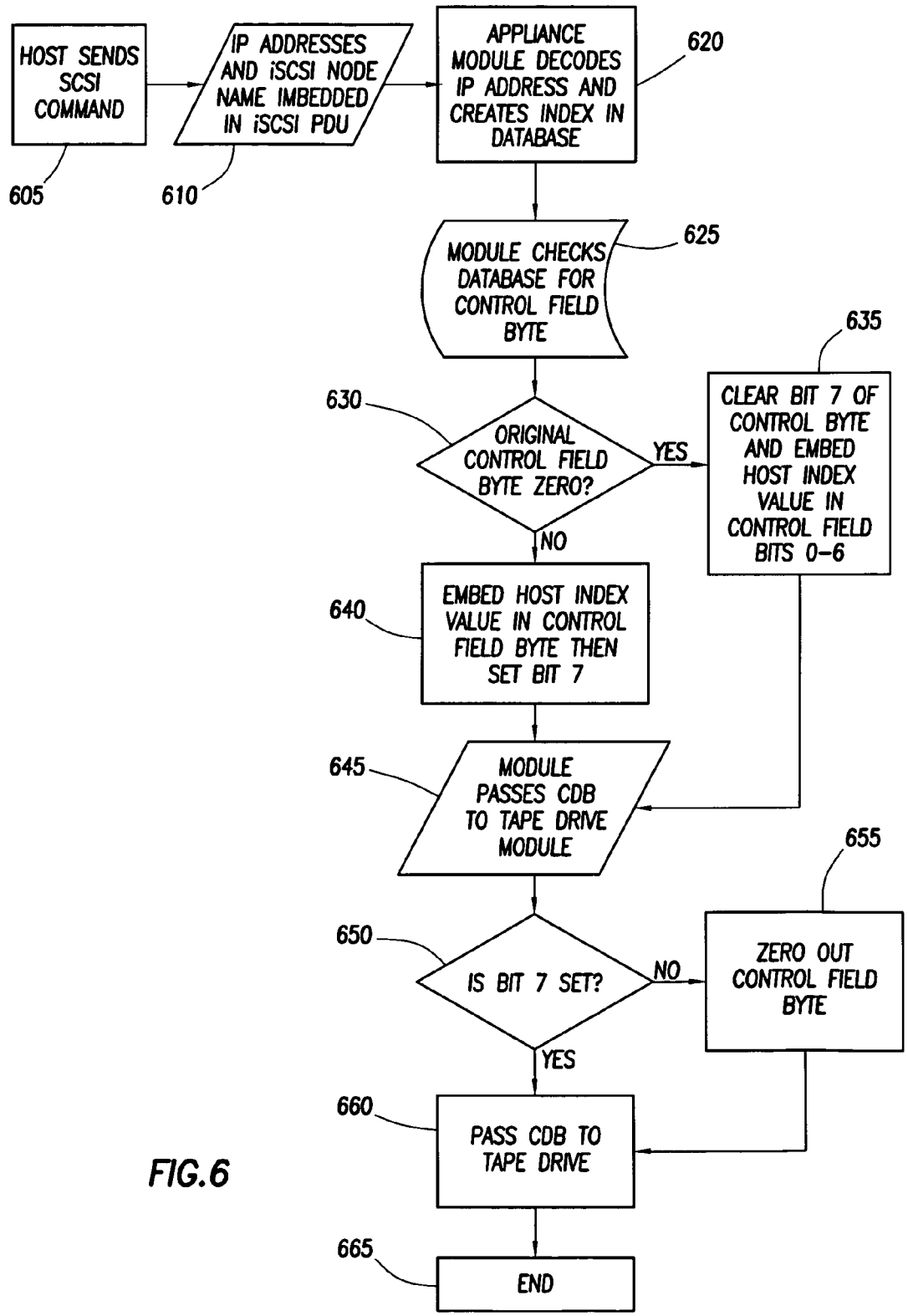
FIG. 6 is a flow diagram of a method for identifying an iSCSI host at a SCSI layer.

This method is further illustrated in FIG. 6. FIG. 6 begins with a host sending a SCSI command (block 605). The IP address and the iSCSI node name are embedded in an iSCSI PDU (block 610). The appliance module decodes the IP address and creates an index in a database at block 620. The module also checks a database for the control field byte (block 625). If the original control field byte is zero, (block 630) then bit 7 of the control field byte is cleared and the host index value is embedded in bit 0 through 6 in the control field (635). The module then passes the CDB to the tape via a SCSI module at block 645. If, on the other hand, the original control field byte is not zero, then the host index value is embedded in a control field byte (bits 0-6), and bit 7 of the control field byte is set to one. Again, the module will then pass the CDB to the tape drive module (block 645). At the tape drive module, the index module checks bit 7. If bit 7 is not set (zero), then the original control field byte was zero, so the entire control field byte shall be zeroed out (block 655). If, however, bit 7 is set (one), the CDB is passed to the tape drive unmodified (e.g., with the non-zero value in the control byte) (block 660). In another example before the CDB is passed to the tape drive, bits 0 through 6 of the control field byte are zeroed out, notwithstanding bit 7 of the CDB byte being set to one. After the CDB is pass the tape drive, the method ends at block 665. The tape backup device would than reject the SCSI CDB with a check condition indicating an invalid CDB.

Figure 7:
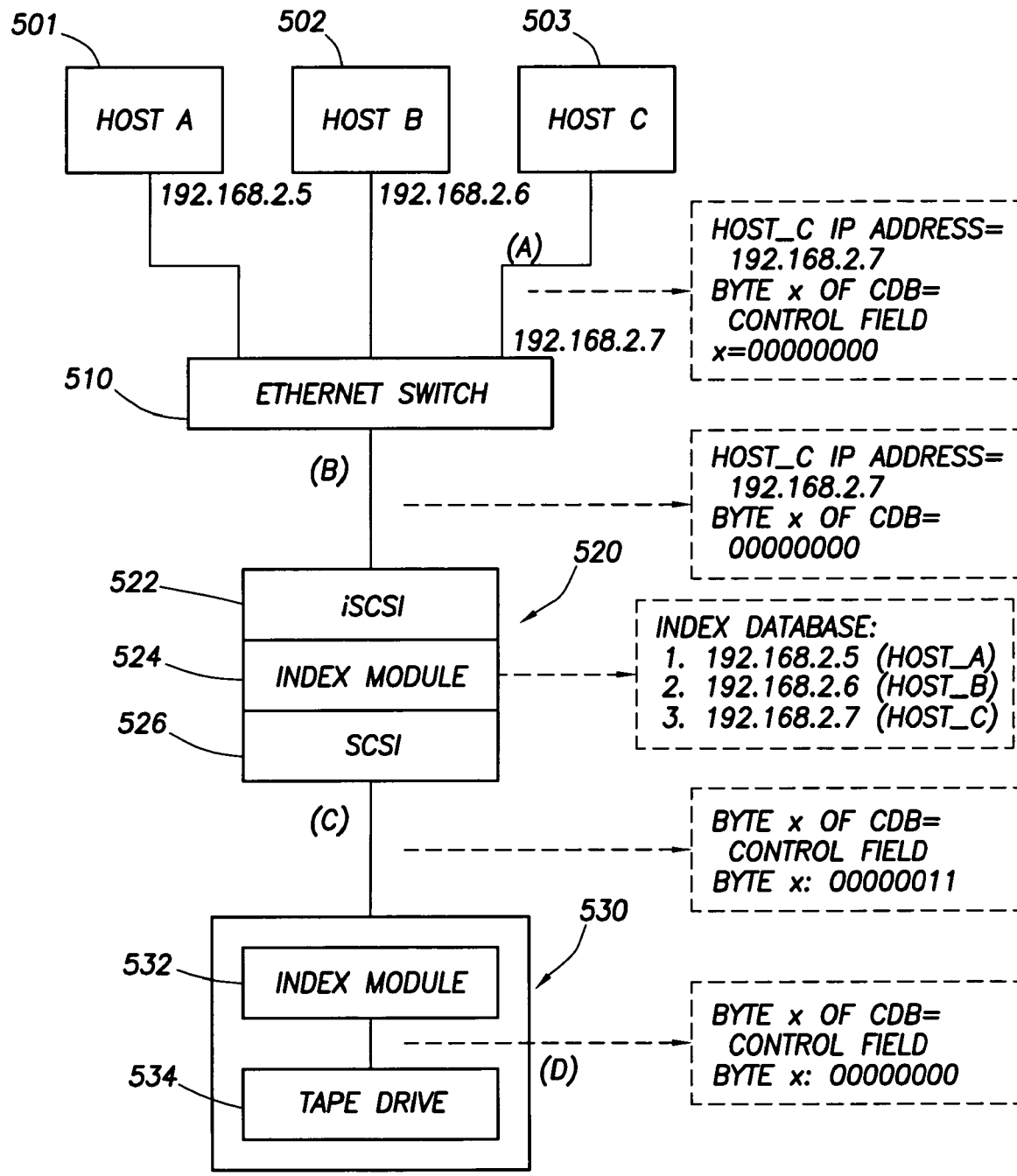
FIG. 7 is a diagram of a system having a zero control field byte for identifying an iSCSI host at a SCSI layer.

An example system having a control field byte value of zero is shown in FIG. 7. Here, Host A has IP address 192.168.2.5, Host B has IP address 192.168.2.6 and Host C has IP address 192.168.2.7. Host C (503) sends a SCSI command to the SCSI target device. The iSCSI protocol data unit (PDU) at Point A contains the IP Address, the iSCSI node name and the embedded SCSI CDB. The IP address of the issuing host is 192.168.2.7, and the control field byte is zero. The iSCSI PDU travels through the ethernet switch (Point B), which is connected directly to the iSCSI-SCSI appliance. The ethernet switch then passes the command to an iSCSI to SCSI appliance 520. Before the command reaches the iSCSI to SCSI appliance 520, the IP address of the host is 192.168.2.7, and the control field byte of the CDB is zero.

At the iSCSI to SCSI appliance 520, the index module 524 decodes the IP Address and iSCSI node name. The IDM checks an internal database in the appliance and determines which byte of the CDB the control field is located. The IDM determines if the original contents of the control field is zero. If the value is non-zero, set bit 7 (Identification bit) of the control field byte to one to indicate that the original value of the control field was non-zero. If the original control field byte value is zero, leave bit 7 as zero. The IDM embeds the index value (which points to a database index) in bits 0-6 of the control field byte. The IDM passes the new SCSI CDB to the SCSI interface of the iSCSI-SCSI appliance. The SCSI interface system of the appliance passes the SCSI CDB through the SCSI bus (Point C), which is then received by the SCSI target device IDM. As shown in the dotted box adjacent to Figure C within FIG. 7, byte X of the CDB has a value of 3 binary signifying that host C is the issuing host for this command. The output of a SCSI analyzer connected to Point C of the system shown in FIG. 7 will include the value of 3. Host C may be identified as the issuing host by comparing this number with the index database stored in the appliance. Moreover, since the original CDB byte value is zero, bit 7 of the CDB byte is maintained at a zero value.

Once the SCSI command is received at the index module at the SCSI target, the CDB byte should be reset to its original value. The SCSI target device IDM checks bit 7 of the control byte field to determine if the original control field byte value was non-zero. If bit 7 is set to one, then the original control field byte was non-zero. The SCSI CDB is passed to SCSI target device (Point D) and the SCSI tape target device will reject the CDB (per specification) with a check condition due to non-zero control field. Otherwise, the SCSI target device IDM checks bit 7 of the control field byte to determine if the original value was zero. If bit 7 is set to zero, then the original control field byte was zero. Therefore, the entire SCSI CDB control field byte is cleared (set to zeros), just as it was when the CDB was received by the iSCSI-SCSI appliance. The CDB is then passed to the target tape device (Point D) for processing. This example demonstrates that even if the control field value is zero, the host IP address and host name will still be determined at the SCSI layer by identifying the index number in the control field byte and mapping that value to the index value in the appliance database. The tape drive will still be able to detect the CDB as valid and return good status. When the command descriptor block reaches the tape drive, it will arrive as a zero value just as it did when the iSCSI to SCSI appliance originally received it.

Figure 8:
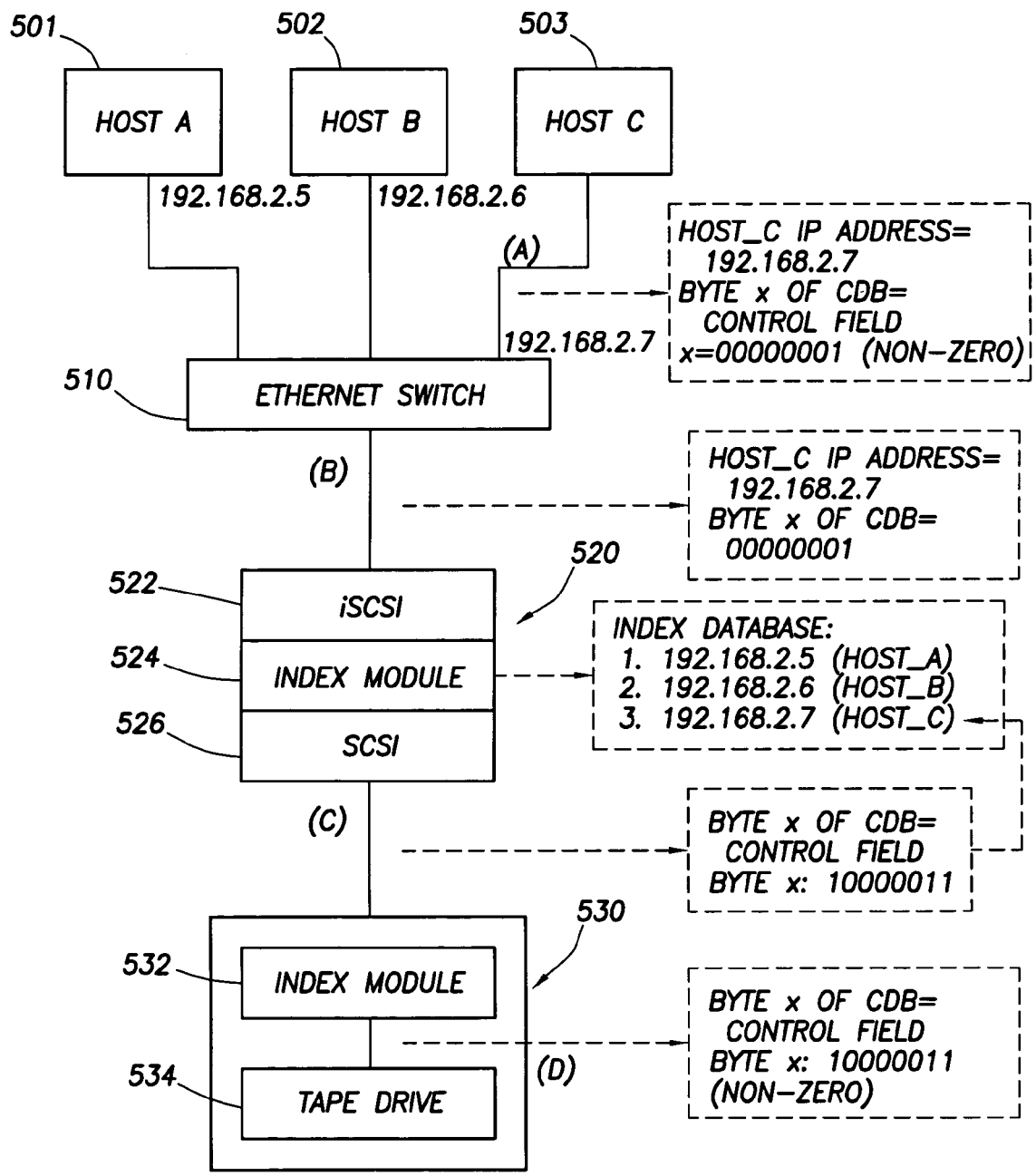
FIG. 8 is a diagram of a system having a non-zero control field byte for identifying an iSCSI host at a SCSI layer.

FIG. 8 illustrates an example involving the identification of the IP address of an issuing host when the control field value is non-zero. Initially, Host C issues a SCSI command. Host C has an IP address of 192.168.2.7. As shown in the dotted box adjacent to A, the control field byte is 00000001 (non-zero). The SCSI command is transmitted through an ethernet switch 510, which transfers the SCSI command to an iSCSI to SCSI appliance 520. At point B, the host IP address of the issuing host is still 192.168.2.7 and the control field byte is still non-zero.

At the iSCSI to SCSI appliance 520, the index module 524 identifies the IP address of the issuing host. The IDM checks the identified IP address against a table of IP addresses. The index database includes the IP addresses of the list of possible issuing hosts and an associated index value. The IDM identifies the corresponding table index associated with the identified IP address. The index module also identifies the CDB and reads that corresponding control field value. If the control field is non-zero, as in this example, the index module identifies the control field byte as non-zero and additionally sets bit 7 of the control field to one, signifying a non-zero value. This identified index value then embedded or encoded into bits 0-6 of the control field byte. This encoding is shown by byte X (control field) having the value of 10000011 in the dotted box adjacent to Point C of FIG. 8. The modified SCSI command is then sent from the iSCSI to SCSI appliance 520 to the target device 530.

As in the other examples, the control field byte value of the SCSI command must be restored to its original value before being sent to the tape drive 534. An index module 532 first identifies if the original control field byte value was zero or non-zero by analyzing bit 7 of the control field byte. In this example, bit 7 is one signifying the original control field byte to be non-zero. Because the original control field byte is non-zero, the index module may then transfer or transmit the modified CDB byte to the tape drive. The tape drive will then reject the CDB due to the non-zero control field byte value. Alternatively, the index module indicates that the non-zero control field byte value may clear bit 0 through 6 before sending this modified command to the SCSI tape drive 534. In any event, the SCSI tape drive 534 will receive a non-zero CDB byte value and consequently reject that command.

This example demonstrates that even if the control field value is non-zero, the host IP address and host name will be determined at the SCSI layer by identifying the index number in the control field byte in mapping that value to the index value in the appliance database. The tape drive will detect the CDB as invalid and return a check condition per tape drive specification. When the command descriptor block reaches the tape drive, it will appear as a non-zero value just as it did when the iSCSI to SCSI appliance originally received it. Here, the Host IP address or iSCSI node name can be determined at the SCSI layer by embedding an index value in the control field and mapping it to an index in the iSCSI-SCSI appliance.

The invention, therefore, is well adapted to carry out the objects and to attain the ends and advantages mentioned, as well as others inherent therein. For example, the invention is not limited to version 4 of the Internet Protocol (IPv4), but may be applied to additional versions such as version 6 of the Internet Protocol (IPv6). While the invention has been depicted, described and is defined by reference to exemplary embodiments of the invention, such references do not imply a limitation on the invention, and no such limitation is to be inferred. The invention is capable of considerable modification, alternation and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for identifying a host at a physical layer of an information handling system, the method comprising:

issuing an original command from one of a plurality of hosts, the original command is encoded in a first protocol;

receiving the original command by a protocol converting module;

determining an address of the one of the plurality of hosts that issued the original command;

converting the first protocol to a second protocol, wherein the original command is encoded in the second protocol;

identifying an unused field in the original command encoded in the second protocol;

adding an identifier to the original command encoded in the second protocol to make a revised command, the identifier associating the one of the plurality of hosts that issued the original command;

encoding the identifier of the host that issued the original command in the unused field; and sending the revised command to a target device.

2. The method of claim 1, further comprising converting the revised command to the original command.

3. The method of claim 1, wherein the original command includes a fibre channel command.

4. The method of claim 1, wherein the original command includes an iSCSI command.

5. The method of claim 1, wherein the revised command includes a SCSI command.

6. The method of claim 1, wherein the physical layer includes a SCSI target device.

7. The method of claim 1, wherein the host includes a fibre channel host.

8. The method of claim 1, wherein the host includes an iSCSI host.

9. The method of claim 1, wherein the first protocol includes a fibre channel protocol, and wherein the address of the host includes a port identification address.

10. The method of claim 9, wherein determining the address of the one of the plurality of hosts that issued the original command includes decoding a fibre channel frame to obtain the fibre channel port identification address, the fibre channel frame including the original command and the fibre channel identification address of the host that issued the original command.

11. The method of claim 9, wherein the adding an identifier to the original command encoded in the second protocol includes:

identifying a control field byte associated with the original command encoded in the first protocol, the control field byte including eight bits, one of the eight bits including an identification bit, wherein a SCSI device will reject a SCSI command having a non-zero control field;

setting an identification bit to one if a value of the control field byte is non-zero; and encoding the port identification address into the remaining seven bits of the control field byte.

12. The method of claim 11, wherein converting the revised command to the original command includes clearing all bits in the control field byte if the identification bit is equal to zero.

13. The method of claim 1, wherein the first protocol includes an Internet protocol, and wherein the address of the host includes an index, the index associating an Internet protocol address or iSCSI node name.

14. The method of claim 1, wherein the first protocol includes an iSCSI protocol.

15. The method of claim 14, wherein determining the address of one of the plurality of hosts that issued the original command includes decoding an iSCSI protocol data unit to obtain an IP address and an iSCSI node name, the iSCSI protocol data unit including the original command, the IP address of the host that issued the original command, and the iSCSI node name of the host that issued the original command.

16. The method of claim 14, further comprising:
creating a table, entries of the table including IP addresses of the hosts, an index being associated with each entry of the table;
wherein the adding an identifier to the original command encoded in the second protocol includes:
identifying a control field byte of a command descriptor block, the control field byte including eight bits;
identifying an IP index value of the table, wherein the IP index value is the index value of the entry of the table having an IP address equivalent to the IP address of the host that issued the original command;
setting an identification bit to one if a value of the control field byte is non-zero; and
encoding the IP index value into the remaining seven bits of the control field byte, the index value associated with the IP address or iSCSI node name of the issuing host.

17. The method of claim 1, wherein the second protocol includes a SCSI protocol.

18. The method of claim 1, wherein the protocol converting module includes a fibre channel to SCSI appliance.

19. The method of claim 18, wherein the fibre channel to SCSI appliance includes a module for determining the address of the host.

20. The method of claim 1, wherein the protocol converting module includes an iSCSI-SCSI appliance.

21. The method of claim 20, wherein the iSCSI to SCSI appliance includes a module for determining the address of the host.

22. The method of claim 1, wherein the target device includes a module for identifying the address of the host.

23. The method of claim 1, wherein the adding an identifier to the original command encoded in the second protocol includes:
creating a reference table, each element of the reference table being associated with the one of the plurality of hosts and an index value, wherein the one of the plurality of hosts is identified by an associated index value; and
encoding the associated index value of the one of the plurality of hosts that issued the original command in the unused field.

24. A method for identifying a fibre channel host at a SCSI layer of an information handling system, the method comprising:
issuing an original SCSI command encoded in a fibre channel protocol from one of a plurality of hosts, the original SCSI command having a control field;
receiving the original SCSI command at a fabric switch, the fabric switch having a port address, the port address being related to the one of the plurality of hosts that issued the original SCSI command;
transmitting the original SCSI command to a fibre channel to SCSI appliance;
determining the one of the plurality of hosts that issued the original SCSI command;
converting the original SCSI command encoded in the fibre channel protocol to an original SCSI command encoded in a SCSI protocol;
modifying the control field of the original SCSI command encoded in the SCSI protocol to include an identifier to make a revised SCSI command, the identifier associating the one of the plurality of hosts that issued the original SCSI command encoded in the fibre channel protocol;
sending the revised SCSI command to a target device; and
converting the revised SCSI command encoded in the SCSI protocol to the original SCSI command encoded in the SCSI protocol.

25. A method for identifying a fibre channel host at a SCSI layer of an information handling system, the information handling system including a plurality of hosts, a fabric switch responsive to a fibre channel protocol, an appliance for converting the fibre channel protocol into a SCSI protocol, a target device responsive to the SCSI protocol, one of the plurality of hosts issuing an original SCSI command encoded in the fibre channel protocol, the method comprising:
issuing an original SCSI command encoded in the fibre channel protocol from one of the plurality of hosts, the original SCSI command having a control field;
receiving the original SCSI command at the fabric switch, the fabric switch having a port address, the port address being related to the one of the plurality of hosts that issued the original SCSI command;
transmitting the original SCSI command to a fibre channel to SCSI appliance;
determining the port address of the one of the plurality of hosts that issued the original SCSI command;
identifying a value of the control field in the original SCSI command, wherein a target SCSI device will reject a SCSI command having a non-zero control field;
converting the original SCSI command encoded in the fibre channel protocol to an original SCSI command encoded in the SCSI protocol;
setting an identification bit to one if the original control field is non-zero, the identification bit being included in the control field;
encoding the port address of the host that issued the original command in the control field of the original SCSI command encoded in the SCSI protocol to make a revised SCSI command having a revised control field;
sending the revised SCSI command to a target device; and
setting a revised control field byte of the revised SCSI command encoded in the SCSI protocol to the zero if the identification bit is zero.

26. A method for identifying a host at a SCSI layer of an information handling system, the method comprising:
issuing an original SCSI command encoded in an iSCSI protocol from one of a plurality of hosts, each host having an IP address, the original SCSI command including a control field;
receiving the original SCSI command at an Ethernet switch;
transmitting the original SCSI command to an iSCSI-SCSI appliance;
determining the one of the plurality of hosts that issued the original SCSI command;
converting the original SCSI command encoded in the iSCSI protocol to an original SCSI command encoded in a SCSI protocol;
modifying the control field of the original SCSI command encoded in the SCSI protocol to include an identifier to make a revised SCSI command, the identifier associating the one of the plurality of hosts that issued the original SCSI command encoded in the iSCSI protocol;
sending the revised SCSI command to a target device; and
converting the revised SCSI command encoded in the SCSI protocol to the original SCSI command encoded in the SCSI protocol.

27. A method for identifying a host at a SCSI layer of an information handling system, the information handling system including a plurality of hosts, an Ethernet switch responsive to an Internet Protocol, an appliance for converting an iSCSI type protocol into a SCSI protocol, a target device responsive to the SCSI protocol, one of the plurality of the hosts issuing an original SCSI command encoded in the iSCSI protocol, the iSCSI protocol including the Internet Protocol, the method comprising:

- issuing an original SCSI command encoded in the iSCSI from one of the plurality of hosts, each host having an IP address, the original SCSI command including a control field;
- receiving the original SCSI command at an Ethernet switch;
- transmitting the original SCSI command to an iSCSI-SCSI appliance;
- determining the IP address of the one of the plurality of hosts that issued the original SCSI command;
- creating a table, entries of the table including the IP addresses of the hosts, an index value is associated with each entry of the table;
- identifying an IP index value of the table, wherein the IP index value is the index value of the entry of the table having an IP address equivalent to the IP address of the host that issued the original SCSI command;
- identifying a value of the control field in the original SCSI command, wherein a target SCSI device will reject a SCSI command having a non-zero control field;
- converting the original SCSI command encoded in the iSCSI protocol to an original SCSI command encoded in a SCSI protocol;
- setting an identification bit to one if the control field of the original SCSI command is non-zero, the identification bit being included in the control field;
- encoding the IP index value of the host that issued the original command in the control field of the original SCSI command encoded in the SCSI protocol to make a revised SCSI command having a revised control field;
- sending the revised SCSI command to a target device; and
- if the identification bit is zero, setting a revised control field byte of the revised SCSI command encoded in the SCSI protocol to zero.

* * * * *

UNITED STATES PATENT AND TRADEMARK OFFICE
CERTIFICATE OF CORRECTION

PATENT NO. : 7,586,942 B2  Page 1 of 1
APPLICATION NO. : 10/731222
DATED : September 8, 2009
INVENTOR(S) : Golasky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1610 days.

Signed and Sealed this

Twenty-first Day of September, 2010

David J. Kappos
*Director of the United States Patent and Trademark Office*